United States Patent
Hobbs

(10) Patent No.: US 7,612,776 B2
(45) Date of Patent: Nov. 3, 2009

(54) FUNCTIONS ACTING ON ARBITRARY GEOMETRIC PATHS

(75) Inventor: Craig A. Hobbs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 10/940,445

(22) Filed: Sep. 14, 2004

(65) Prior Publication Data
US 2005/0034059 A1    Feb. 10, 2005

(51) Int. Cl.
*G06T 11/20* (2006.01)
(52) U.S. Cl. .............. 345/441; 345/474; 345/619; 345/418; 345/442; 345/443
(58) Field of Classification Search ........... 345/418, 345/619, 441–443
See application file for complete search history.

(56) References Cited

U.S. PATENT DOCUMENTS

| | | | | |
|---|---|---|---|---|
| 5,452,238 | A * | 9/1995 | Kramer et al. | 345/443 |
| 5,539,868 | A * | 7/1996 | Hosoya et al. | 345/471 |
| 5,826,065 | A | 10/1998 | Hinsberg, III et al. | |
| 6,310,622 | B1 * | 10/2001 | Asente | 345/441 |
| 6,512,522 | B1 * | 1/2003 | Miller et al. | 345/474 |
| 7,028,260 | B1 * | 4/2006 | Morsello | 715/210 |
| 7,256,799 | B2 * | 8/2007 | Hatanaka et al. | 345/629 |
| 7,453,464 | B1 * | 11/2008 | Acquavella | 345/474 |
| 7,515,154 | B2 * | 4/2009 | Tanaka et al. | 345/473 |
| 2005/0041042 | A1 * | 2/2005 | Rajarajan et al. | 345/619 |
| 2005/0140694 | A1 * | 6/2005 | Subramanian et al. | 345/619 |
| 2006/0232603 | A1 * | 10/2006 | Schuster et al. | 345/619 |
| 2006/0265642 | A1 * | 11/2006 | Hearn et al. | 715/515 |
| 2006/0271869 | A1 * | 11/2006 | Thanu et al. | 715/764 |
| 2007/0204217 | A1 * | 8/2007 | Ross et al. | 715/523 |

FOREIGN PATENT DOCUMENTS

EP    0837430    4/1998

OTHER PUBLICATIONS

Sun, Harold C. et al., "Automating Gait Generation," University of Pennsylvania, Philadephia, PA, SIGGRAPH 2001 (9 pages).
Gobbetti, Enrico, "An Integrated Environment to Visually Construct 3D Animations," Center for Advanced Studies, Research and Development in Sardinia, International Conference on Computer Graphics and Interactive Techniques, 1995 (4 pages).
Gabriely, Yoav et al., "Spanning-Tree Based Coverage of Continuous Areas by a Mobile Robot," Annals of Mathematics and Artificial Intelligence 31:77-98, 2001, Copyright 2001 Kluwer Academic Publishers, Printed in the Netherlands (22 pages).
Shiller, Zvi, "Optimal Robot Motion Planning and Work-Cell Layout Design," Robotica (1997) vol. 15, pp. 31-40, Copyright 1997 Cambridge University Press (10 pages).
Spence, A.D., "Parallel Processing for 2-1/2 D Machining Simulation," Solid Modeling 01, Ann Arbor, Michigan, Copyright ACM 2001 (9 pages).
Joest, Matthias et al., "A User Aware Tour Proposal Framework Using a Hybrid Optimization Approach," GIS '02 Nov. 8-9, 2002, McLean, Virginia (7 pages).

* cited by examiner

*Primary Examiner*—M Good Johnson
(74) *Attorney, Agent, or Firm*—Perkins Coie LLP

(57) ABSTRACT

A facility for evaluating a spreadsheet cell is described. The facility reads a function call stored in a spreadsheet cell. The function call specifies an arbitrary geometric path and an operation to be performed on the specified path. The facility performs the specified operation on the specified path, and attributes one or more values produced thereby as the evaluated value of the spreadsheet cell.

42 Claims, 7 Drawing Sheets

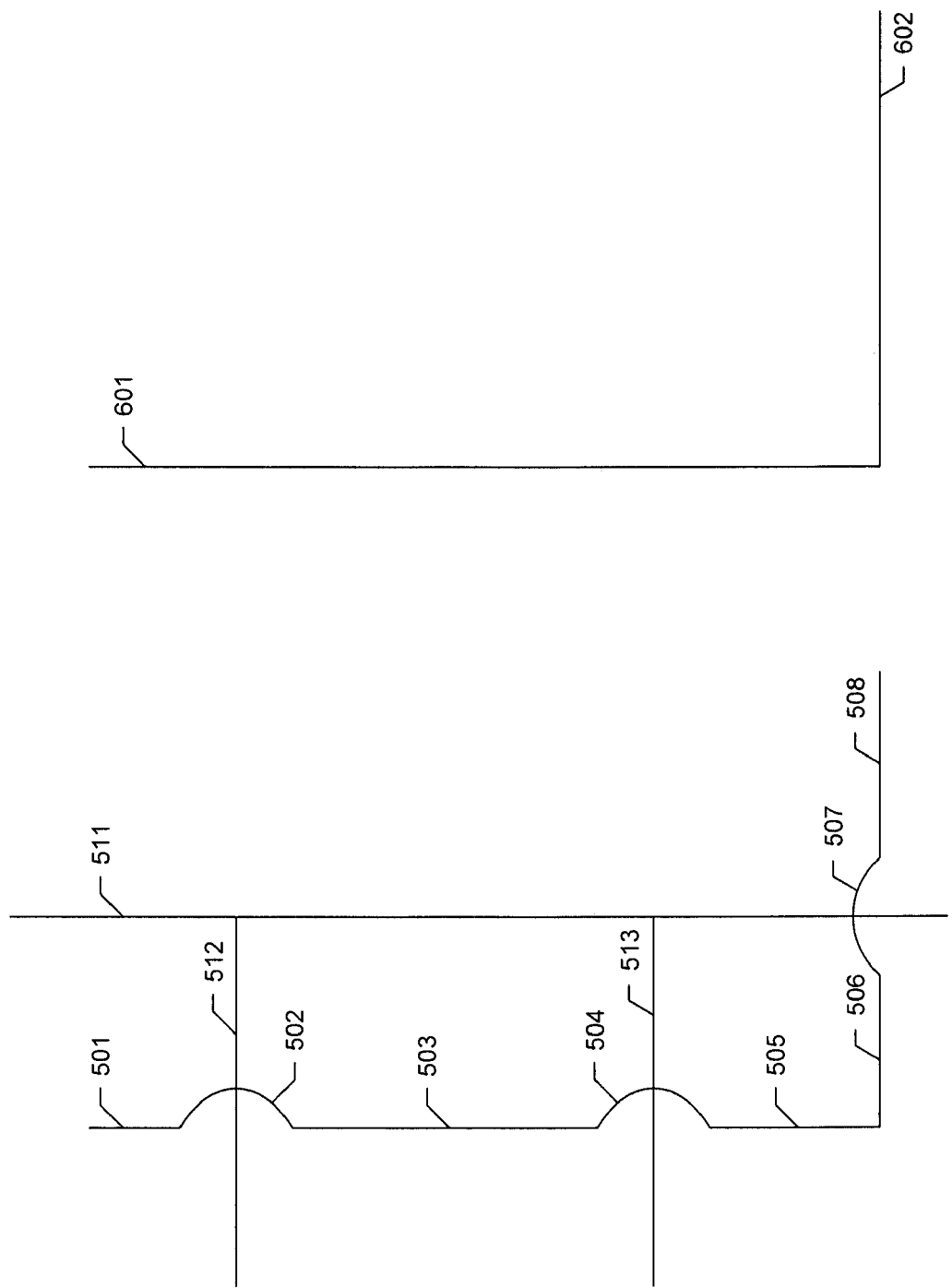

FUNCTIONS ACTING ON ARBITRARY GEOMETRIC PATHS

CROSS-REFERENCE TO RELATED APPLICATIONS

This application is related to U.S. patent application Ser. No. 10/337,654, entitled "METHOD AND SYSTEM FOR SELECTING ELEMENTS IN A GRAPHICAL USER INTERFACE", filed on Jan. 7, 2003; U.S. patent application Ser. No. 10/716,761, entitled "METHOD AND SYSTEM FOR SELECTING AND MANIPULATING MULTIPLE OBJECTS", filed on Nov. 19, 2003; and U.S. patent application Ser. No. 10/811,234, entitled "METHOD AND SYSTEM FOR FORMULAICALLY BOUNDING DATA IN A SPREADSHEET", filed on Mar. 26, 2004, each of which is hereby incorporated by reference in its entirety.

TECHNICAL FIELD

The present invention is directed to the field of software applications for creating or modifying drawings containing geometric shapes.

BACKGROUND

Drawing applications like MICROSOFT VISIO enable users to create drawing documents. For example, a user may use a drawing application to add a straight or curved line segment to a drawing document. A user can concatenate such segments to create a more complex shape. Indeed, it is common for predefined shapes provided with a drawing application for users to incorporate in drawing documents in a single step to be defined as a concatenation of segments, also called a "path."

After a user incorporates such a predefined shape in a drawing document, the user can manipulate it in a variety of ways, such as resizing it in one or both dimensions, attaching text, connectors, or callouts, etc.

Some drawing applications use a spreadsheet engine to perform calculations involved in creating or modifying a drawing document. In particular, a drawing application may represent all or part of a drawing document as one or more spreadsheets comprised of cells each containing a value related to the drawing document.

For example, a drawing application may have a user interface that permits a user to create and place new object instances, such as a predefined shape, or a user-defined shape. In some drawing applications, each object instance created by a user is represented by data stored in one or more spreadsheets. Where a user uses the user interface to modify an existing object instance, the drawing application typically responds by modifying some of the spreadsheet data representing the object, which in turn changes the way that the object instance is subsequently displayed.

Some predefined shapes include special features, such as textual labels or connectors that are aligned relative to a particular point on the shape, such as a vertex of the shape, or in the center of one of the segments that make up the shape. Creating a predefined shape having such special features often involves a significant level of manual effort on the part of the developer. Where such a predefined shape is subject to modifications by the user, such as resizing the shape, changing its aspect ratio, deforming the shape, etc., designing the shape to properly display its special features no matter how it is modified by a user can be particularly difficult.

Further, while it would be desirable to provide such special features for use with user-defined shapes and other user-defined paths, no tools are available that would make it possible to do so.

In view of the above discussion, new functionality for supporting special drawing features for arbitrary paths would have significant utility.

BRIEF DESCRIPTION OF THE DRAWINGS

FIG. 5 is a drawing diagram showing a path that, when placed in a document in such a way that it overlaps other line segments in the drawings, has line jumps added to it.

FIG. 6 is a path diagram showing the normalized path to find in the normalized path definition shown in Table 4.

DETAILED DESCRIPTION

Introduction

A software facility for providing functions that perform operations on arbitrarily-defined paths and may be called from spreadsheet cells—such as spreadsheet cells used to represent a drawing produced using a drawing application—("the facility") is described. Developers may use these functions, for example, to define predefined shapes having a variety of special features. Developers may further use these functions to enable users of a drawing program to themselves create shapes and other paths and apply special features to them.

Such special features can include text bound to a shape or other path, or tangent to a shape or other path; and displayed indications of a shape's area and/or the lengths of its sides.

In some embodiments, the facility provides functions that perform operations on arbitrary paths such as the following: determine the length of a path; determine the area of a closed path; determine a point a certain percentage of the way along a path; determine the point on a path nearest another point; determine the number of segments in a path; determine the shape of a tangent to a path at a particular point on its length; and determine the intersection of two paths.

In some embodiments, the functions provided by the facility can be called either with respect to an entire path, or with respect to a particular segment of the path. In some embodiments, the functions provided by the facility can be called with reference either an absolute or relative position on a path or path segment.

Figure 1:
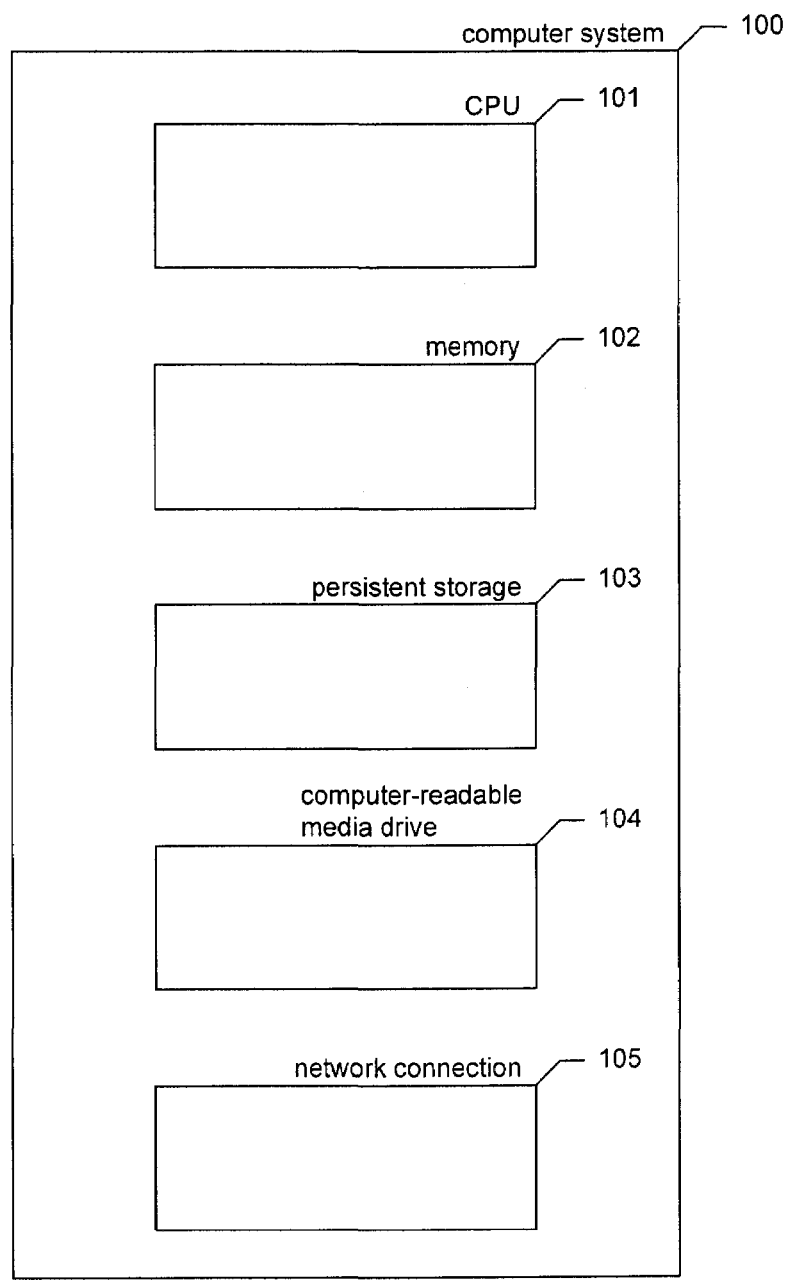
FIG. 1 is a block diagram showing some of the components typically incorporated in at least some of the computer systems and other devices on which the facility executes.

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 2:
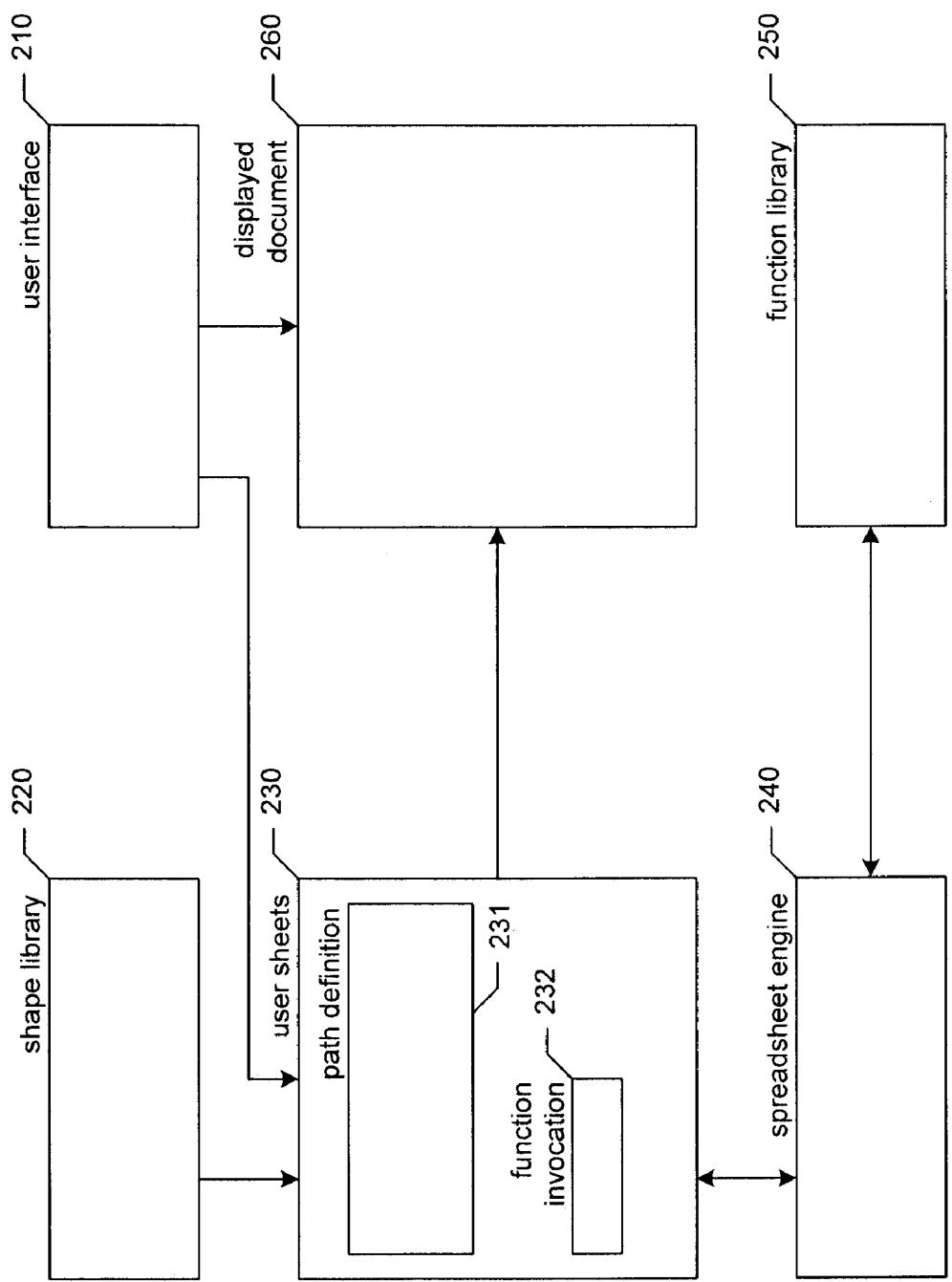
FIG. 2 is a component diagram showing components used by the facility and their interactions.

FIG. 2 is a component diagram showing components used by the facility and their interactions. To add a shape to a drawing document, a user uses a user interface 210 of the drawing application to select a shape from a shape library 220 and place it in the document. As a result of these user interface manipulations, data is added to one or more user spreadsheets 230 representing the document. The added data includes a path definition 231, as well as invocations 232 of one or more of the functions provided by the facility that each refer to the path definition. In order to resolve the function invocation, a spreadsheet engine 240 calls the function in a function library 250. The shape is then displayed in the displayed document 260 based on the contents of the path definition and one or more values produced in evaluating the function invocation.

In some embodiments, when any of the path definition data changes, the spreadsheet engine reevaluates each function that refers to the path definition by again calling the function.

Context of Functions

Each function takes at least path reference argument (identified below as "pathRef," and variants) that identifies a path—i.e., a series of curved or straight segment geometry objects—on which the function will work. This reference may vary in its implementation depending on the spreadsheet engine. In some embodiments, a path reference contains the identity of a special path reference cell (e.g., the path reference cell's row/column location or name) that represents a larger group of cells that together define the path, such as a geometry row. For example, to compute the length of a geometric path defined in a set of cells represented by a path reference cell named Geometry1.Path, a call to the PATHLEN function—discussed further below—passing Geometry1.Path as the PATHLEN function's path reference argument, is stored in a cell named User.Tmp:

User.Tmp=PATHLEN(Geometry1.Path)

In some embodiments, special implied trigger recalculation logic is attached to each path reference cell, so that when any cell that affects the referred-to geometry changes, the referring function call is also recalculated.

Some functions allow the caller to specify operation on a specific segment of a path. The segment is referenced by a segment type (identified below as "SegType," and variants) and a segment index (identified below as "segIX," and variants). Table 1 below shows the available segment types:

TABLE 1

| | |
|---|---|
| PSType_WholePath = 0 | The whole path (the default) |
| PSType_FromBegin = 1 | Segment indexed from begin |
| PSType_FromEnd = 2 | Segment indexed from end |

The segment type and segment index arguments are typically optional. If not provided, the segment type is PSType_WholePath, the segment index is ignored, and the entire path is referenced. If the segment type is PSType_FromBegin, the segment index is used to select a segment from the beginning of the path, where the index 0 specifies the first segment of the path. If the segment type is PSType_FromEnd, the segment index is used to select a segment from the end of the, where the index 0 specifies the last segment of the path.

A #REF error is returned by the function if an invalid segment type or an invalid segment index is provided.

By employing end semantics (PSType_FromEnd) in the segment type, the facility permits logic such as "give me the point half way along the last segment" to be easily expressed. This is especially important for shapes that have an unpredictable number of segments in them, such as the Visio dynamic connector.

Several of the geometry functions take Cartesian coordinates (x, y) as arguments. These are assumed to be in the local coordinate space of the given path reference. No coordinate transformation is done on these arguments.

Figure 3:
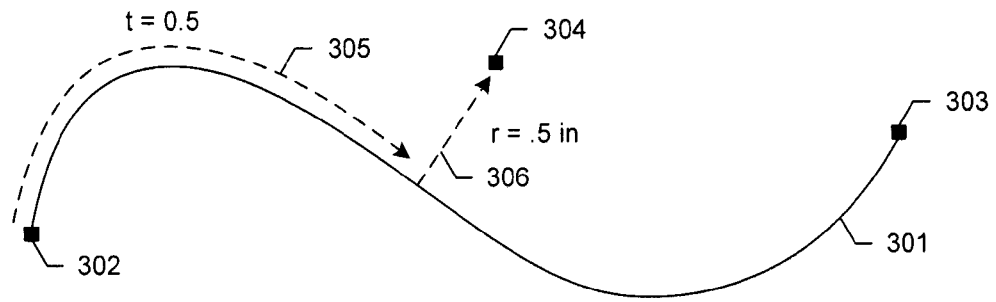
FIG. 3 is a document diagram showing sample path coordinates relative to a sample path.

Several of the geometry functions take path coordinates (t, r) as arguments. In their simplest form, t is a percentage along the path and r is the distance offset from that point perpendicular to the path at that point. FIG. 3 is a document diagram showing sample path coordinates relative to a sample path. FIG. 3 shows a path having a single, curved segment 301. The curve has beginning point 302 and end point 303. The figure shows a point 304 having path coordinates (0.5, 0.5 in.). It can be seen that the point 304 can be reached by, in accordance with t=0.5, traversing 50% of the way from path beginning point 302 to path end point 303, then, in accordance with r=0.5 in., traversing one-half inch normal to the segment at that point.

Geometry functions that take path coordinates as parameters typically also have an optional parameter type argument (identified below as "paramType," and variants) that allows the user to express the parameter t in different forms. Table 2 below shows the available parameter types:

TABLE 2

| | |
|---|---|
| PPType_Percentage = 0 | Percent along path/segment from begin (the default) |
| PPType_PercentageEnd = 1 | Percent along path/segment from end |
| PPType_Distance = 2 | Distance along path/segment from begin |
| PPType_DistanceEnd = 3 | Distance along path/segment from end |

If the parameter type is not provided it defaults to PPType_Percentage. For PPType_Percentage, t=0 is the begin point of the path and t=1 is the end point of the path. For t<0, t is understood to be −t distance along the ray defined by the path's begin point in the direction of the path's tangent angle at it's begin point. For t>0, t is understood to be t−1 distance along the ray defined by the path's end point in the direction of the paths tangent angle at its end point.

Figure 4:
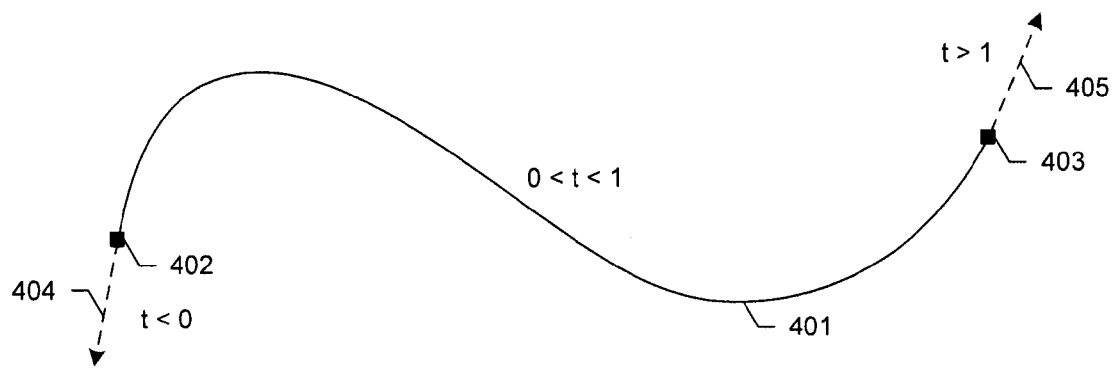
FIG. 4 is a document diagram showing different ranges of t for a sample path.

FIG. 4 is a document diagram showing different ranges of t for a sample path. FIG. 4 shows a path made up of a single, curved segment 401. The path has starting point 402 and ending point 403. Values of t between 0 and 1 fall directly on curved segment 401. Negative values of t fall on a ray whose origin is at starting point 402, and whose direction is the tangent of curved segment 401 at starting point 402. Similarly, values of t greater than 1 fall on a ray 405 that has as its origin the ending point 403 of the curved segment and has as its direction the tangent to the curved segment at its ending point 403.

The other parameter types can all be transformed into PPType_Percentage. Thus, when a geometry function is called with a non-default parameter type, it can transform into the PPType_Percentage form and proceed with its operation in a normalized space. The transformations from the non-default parameter types to PPType_Percentage are defined as follows.

PPType_PercentageEnd defines t=0 as the path's end point and t=1 as the path's begin point. PPType_PercentageEnd is transformed into PPType_Percentage with the simple formula "1−t".

PPType_Distance defines t as a distance along the path from the begin point. For 0<t<length (the path's length), PPType_Percentage is achieved with the formula "t/length". For t<0 no transformation is required—t is the same in PPType_Distance as it is in PPType_Percentage. For t>length, the transformation to PPType_Percentage is achieved with "t−length+1".

PPType_DistanceEnd defines t as a distance along the path from the end point. For 0<t<length (the path's length), PPType_Percentage is achieved with the formula "1−t/length". For t<0, the PPType_Percentage form is achieved with "1−t". For t>length, the transformation to PPType_Percentage is achieved with "length−t".

A #VALUE error is returned by the function if an invalid parameter type argument is provided.

By giving parameter type distance semantics (PPType_Distance and PPType_DistanceEnd), the facility enables distances along a path to be easily computed.

By giving parameter type end semantics (PPType_PercentageEnd and PPType_DistanceEnd), the facility enables logic like "0.5 inches from the end" to be easily expressed.

In some embodiments, when each function is called, the facility first creates a normalized version of each path passed to the function. One aspect of normalization is removing superficial segments added to the path by the drawing program in order to accommodate the path's context in a drawing. One example of these superficial segments are "line jumps": arc segments added to paths by some drawing programs to make clear that overlapping lines do not intersect.

FIG. 5 is a drawing diagram showing a path that, when placed in a document in such a way that it overlaps other line segments in the drawings, has line jumps added to it. The diagram shows this path, made up of segments 501-508, placed relative to other line segments 511-513. Arc segments 502, 504, and 507 are not substantive parts of the path, but were added automatically by the drawing program to make clear that the path does not intersect with line segments 511-513. A definition for this path is shown below in Table 3.

TABLE 3

| | geometry primitive | x | y | a |
|---|---|---|---|---|
| 1 | move to | 0 | 0 | |
| 2 | line to | 0 | .5 | |
| 3 | arc to | 0 | 1 | .3 |
| 4 | line to | 0 | 3 | |
| 5 | arc to | 0 | 3.5 | .3 |
| 6 | line to | 0 | 4.5 | |
| 7 | line to | 1 | 4.5 | |
| 8 | arc to | 1.5 | 4.5 | −.3 |
| 9 | line to | 2.5 | 4.5 | |

In order to normalize this path, the facility generates another path in which the arc to primitives shown on lines 3, 5, and 8 of Table 3—corresponding to superficial path segments 502, 504, and 507 shown in FIG. 5—are removed; and merges the line to primitives formerly separated by an arc to primitive. This yields the normalized path definition shown below in Table 4.

TABLE 4

| | geometry primitive | x | y | a |
|---|---|---|---|---|
| 1 | move to | 0 | 0 | |
| 2 | line to | 0 | 4.5 | |
| 3 | line to | 2.5 | 4.5 | |

FIG. 6 is a path diagram showing the normalized path defined in the normalized path definition shown in Table 4. It can be seen that the normalized path contains only two straight line segments, 601 and 602. Any function provided by the facility called with a reference to the path defined in the path definition shown in Table 3 performs this normalization, then performs subsequent operations on the normalized version of the path.

Function Descriptions

Functions provided by some embodiments of the facility are described below. A function argument wrapped in brackets ("[ ]") is, in some embodiments, an optional argument. An ellipsis (". . .") indicates that a variable number of arguments is, in some embodiments, acceptable. While the functions are shown with arguments corresponding to a two-dimensional space, those skilled in the art will appreciate that the functions may be instead applied to a three-dimensional, using arguments appropriate therefor.

token PATHAREA (token& pathRef)

The PATHAREA function computes the area of a closed path. If the path is not closed, an area of zero is returned.

--- token PATHINT ( token& pathRef1, token& pathRef2, [double xHint], [double yHint], [uint segType1], [ulong segIX1], [uint segType2], [ulong segIX2] )

---

The PATHINT function computes the nearest intersection of two paths nearest to (xHint, yHint). The result is a point (x, y) in coordinates local to pathRef1. The first path is defined by the arguments pathRef1, segType1, and segIX1. The second path is defined by the arguments pathRef2, segType2, and segIX2. The result will be the intersection of the paths nearest to xHint and yHint, or (0, 0) if xHint and yHint are not specified. If an intersection is not found then a #VALUE error is returned.

--- token PATHLEN ( token& pathRef, [uint segType], [ulong segIX] )

---

The PATHLEN function computes the length of the path defined by pathRef, segType, and segIX.

--- token PATHPARAM ( token& pathRef, double x, double y, [uint paramType], [uint segType], [ulong segIX] )

---

The PATHPARAM function computes a point result (t, r) of the point on the path nearest to the given point (x, y). The path is defined by pathRef, segType, and segIX. The argument paramType defines the parameter type of the result t.

```
token PATHPOINT ( token& pathRef, double t, double r, [uint
    paramType], [uint segType], [ulong segIX] )
```

The PATHPOINT function computes a point result (x, y) of the point defined by the point (t, r) along the path. The path is defined by pathRef, segType, and segIX. The argument pathType defines the parameter type of the argument t.

```
token PATHRAYINT ( token& pathRef, double x, double y, double
    angle, [double xHint], [double yHint], [uint segType],
    [ulong segIX] )
```

The PATHRAYINT function computes the intersection of a path and an unbounded line. The path is defined by pathRef, segType, and segIX. The unbounded line is defined by the point (x, y) and the direction angle. The result will be the intersection of the paths nearest to xHint and yHint, or (0, 0) if xHint and yHint are not specified. If not intersection is found then a #VALUE error is returned.

```
token PATHSEGMENT ( token& pathRef, double t, [uint
    paramType] )
```

The PATHSEGMENT function computes the segment index that contains the point on a path defined by pathRef. The point is defined by a parameter, t, and the parameter type, paramType.

token PATHSIZE (token& pathRef)

The PATHSIZE function computes the number of segments in the path defined by pathRef.

```
token PATHTAN ( token& pathRef, double t, [uint paramType],
    [uint segType], [ulong segIX] )
```

The PATHTAN function computes the tangent angle at a point on a path. The path is defined by pathRef, segType, and segIX. The point is defined by the parameter, t, and the parameter type, paramType.

```
token POINTINPATH ( token& pathRef, double x, double y, [bool
    outside], [double r] )
```

The POINTINPATH function returns a Cartesian result point that is bound inside or outside of a path. The result is either the input point (x, y) or the nearest point which matches the bounding criteria. The bounding criteria is comprised of the path, pathRef, the inside/outside argument, outside, and the inset/outset distance, r. If the inside/outside argument is true, the function will return a point outside the path. If the inside/outside argument is false (the default), the function will return a point inside the path. The inset/outset distance allows the user to extend the bound.

Figure 7:
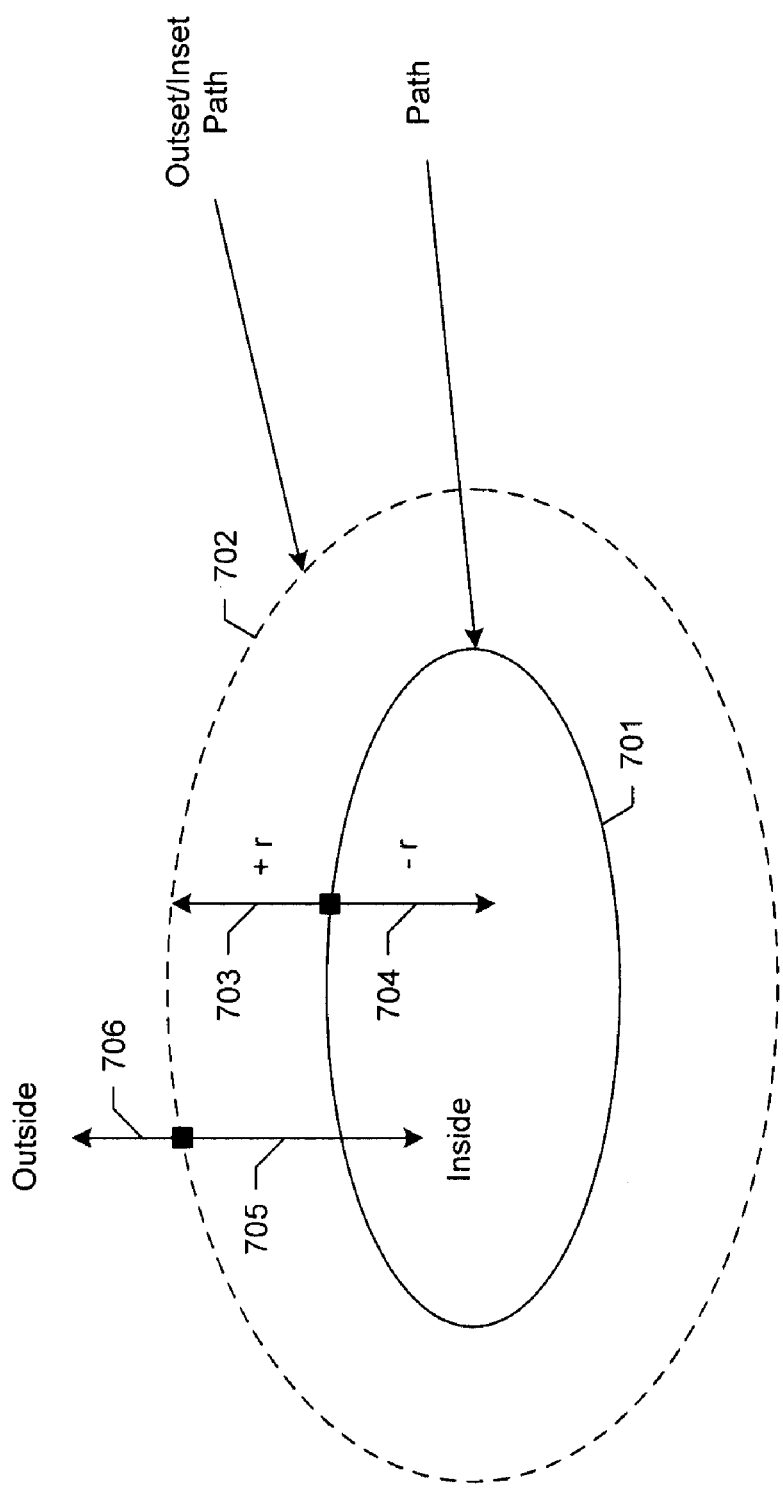
FIG. 7 is a document diagram showing the cases that can be specified for the POINTINPATH function.

FIG. 7 is a document diagram showing illustrating the cases that can be specified for the POINTINPATH function. FIG. 7 shows a path 701. FIG. 7 further shows an outset/inset path 702 that is based on path 701. For positive values of r 703, the outset/inset path is outside path 701 as shown. For negative values of r 704, the outset/inset path is inside path 701 (not shown). Depending upon the value of the outside argument, the function either tests for the point lying inside 705 the outside/inset path (for the value false), or outside 706 outset/inset path (for the value true).

The function performs the following processing. First, the input point (x, y) is hit-test on the path. In other words, the facility determines whether the point is inside the path. If the point is inside and the request is to bound inside, or if the point is outside and the request is to bound outside, and the outset, r, is zero, then the result is the input point (x, y). Otherwise, the facility computes the nearest point on the path to (x, y). If the outset, r, is zero then this is the result. Otherwise, the facility computes the distance from the point nearest to the input point (x, y). A value, rActual is defined as:

double *r*Actual=(*b*IsInside?−distance:distance);

If the following condition is not met:

if ((*b*Outside && *r*<*r*Offset)∥(!*b*Outside &&
       *r*>*r*Offset))

then the result is the input point (x, y). Otherwise the facility computes the result point as the offset, r, in the direction of the normal angle from the path which is the defined by the nearest point and the point (x, y).

```
token POINTONPATH ( token& pathRef, double x, double y,
    [double boundType], [double value1], [double value2],
    ... )
```

The POINTONPATH function returns a Cartesian result point that is bound to a path. The path is defined by pathRef. The result is the nearest point on the path that matches the bound criteria. The bound criteria are comprised of a bound type, boundType, and a series of values. Any number of bound criteria may be provided. Table 5 below shows the available bound types:

TABLE 5

| Bound Type | Value Arguments |
| --- | --- |
| POPType_T_Inclusive = 0 | <tMin>, <tMax> |
| POPType_T_Exclusive = 1 | <tMin>, <tMax> |
| POPType_R_Inclusive = 2 | <rMin>, <rMax> |
| POPType_R_Exclusive = 3 | <rMin>, <rMax> |
| POPType_T_InclusiveEx = 4 | <paramType>, <tMin>, <tMax> |
| POPType_T_ExclusiveEx = 5 | <paramType>, <tMin>, <tMax> |
| POPType_Disabled = 6 | Disabled bound |

The path coordinates form (t, r) of the input point (x, y) is computed using the same process as PATHPARAM. The path coordinates form is then bound using the bound criteria. Suitable techniques for bounding the path coordinates form of the input point are described in the aforementioned U.S. patent application Ser. No. 10/811,234. The result point is then computed from the bound (t, r) using the same process as PATHPOINT.

Function Usage Examples

Figure 8:
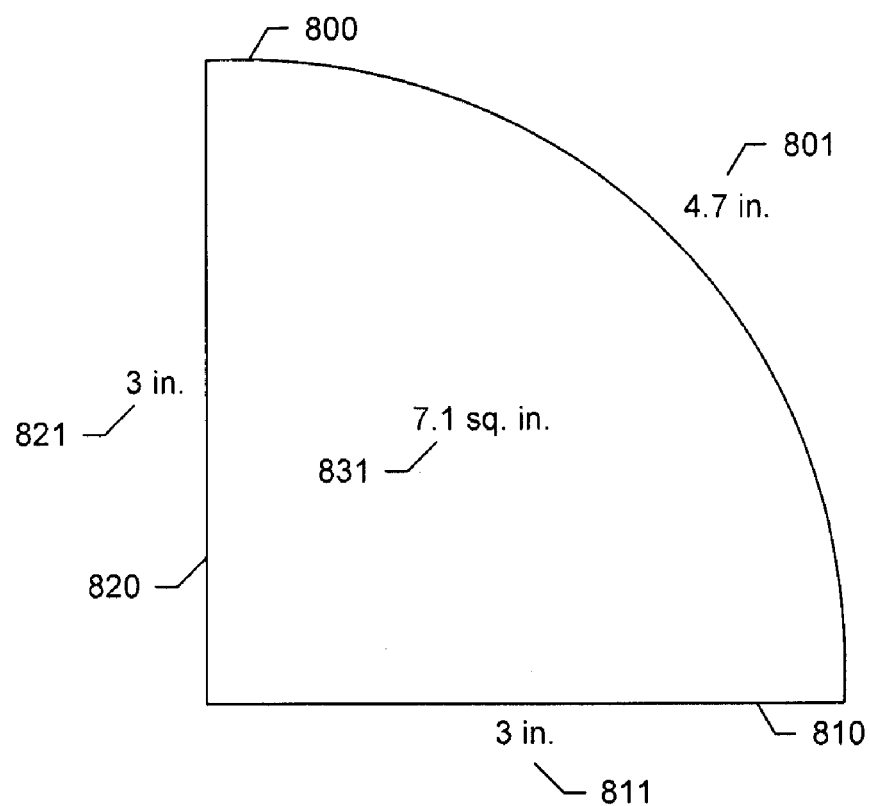
FIG. 8 is a drawing diagram showing a first function usage example.

While the functions described herein can be used in a wide variety of ways, a few representative examples of their use follow:

FIG. 8 is a drawing diagram showing a first function usage example. The diagram shows a shape based upon a path having three segments 800, 810, and 820. The length and inches of each side of the shape, corresponding to each segment of the path are displayed: lengths 801, 811, and 821. Further, the area 831 of the region bounded by the shape is displayed in square inches inside the shape.

The side length and shape area indications can be generated using functions provided by the facility as follows: The shape are can be determined by calling the PATHAREA function as shown below:

PATHAREA (pathRef)

The number of segments in the path can be determined by calling the PATHSIZE function as shown below:

PATHSIZE (pathRef)

After determining that there are three segments in the path, the following three calls to the PATHLEN function may be made in order to determine the length of each side:

```
PATHLEN ( pathRef, 1, 0 )
PATHLEN ( pathRef, 1, 1 )
PATHLEN ( pathRef, 1, 2 )
```

Figure 9:
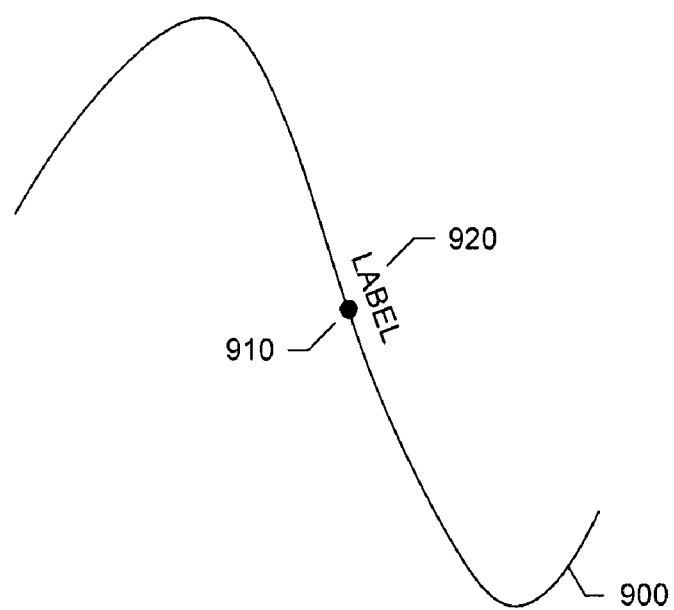
FIG. 9 is a document diagram showing an initial state of the first example.
Figure 10:
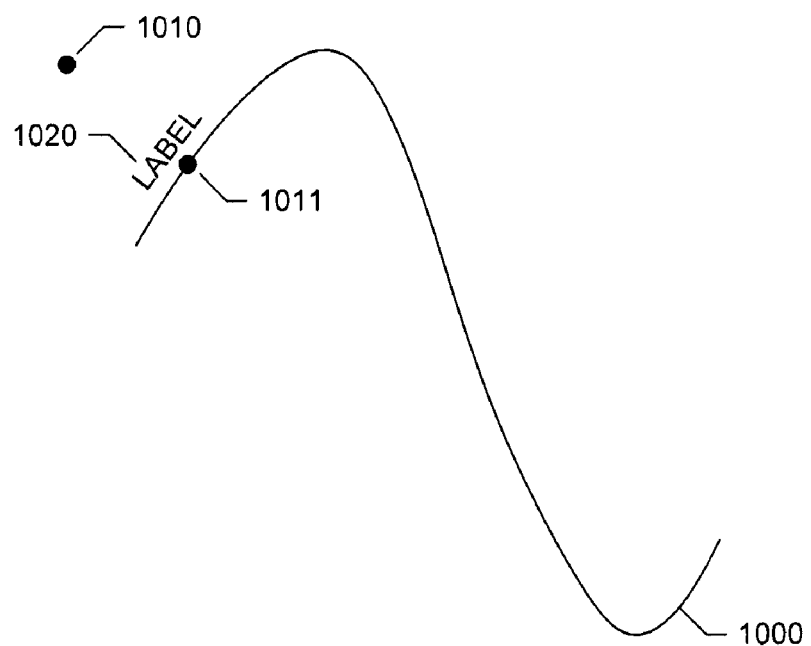
FIG. 10 is a document diagram showing the second example in a second state.

FIGS. 9 and 10 show a second function usage example. FIG. 9 is a document diagram showing an initial state of the first example. FIG. 9 shows a path containing a single segment 900. Label text 920 is displayed in conjunction with the path, based upon an initial, default placement of a control handle 910 in the center of the length of the path. By making the call below to the PATHPOINT function shown below, the initial Cartesian coordinates of the control point can be determined:

PATHPOINT (pathRef, 0.5, 0)

By making the call to the PATHTAN function shown below, the angle for displaying the label text can be determined.

PATHTAN (pathRef, 0.5)

FIG. 10 is a document diagram showing the second example in a second state. FIG. 10 shows the path after the user has moved control point 910 shown in FIG. 9 to a new position, shown as control point 1010 in FIG. 10. When the control point is moved, the call to POINTINPATH function shown below can be made in order to determine a new point 1011 at which to display the label text:

$(x_{display\ point}, y_{display\ point})$=POINTINPATH (pathRef, $x$ control point, $y$ control point)

The call to the POINTINPATH function returns to the Cartesian coordinates for display point 1011 on path 1000. To transform these Cartesian coordinates into path coordinates, the following call to the PATHPARAM function may be made:

$(t_{display\ point}, r_{display\ point})$=PATHPARAM (pathRef, $x_{control\ point}, Y_{control\ point}$)

The angle of the displayed text can then be determined by making the following call to the PATHTAN function:

PATHTAN (pathRef, $t_{display\ point}$)

Those skilled in the art will appreciate that the functions described herein may be used for a wide variety of purposes beyond those discussed above.

Conclusion

It will be appreciated by those skilled in the art that the above-described facility may be straightforwardly adapted or extended in various ways. For example, in some embodiments, a call to any of the described functions can be included in any cell of any spreadsheet, irrespective of whether the spreadsheet is associated with a drawing program. In some embodiments, any of the described functions may be called using functionality of application programs other than spreadsheets, such as macro facilities exposed by word processing programs, or a variety of other kinds of scripting interfaces. In some embodiments, any of the described functions can be called from any program. While the foregoing description makes reference to preferred embodiments, the scope of the invention is defined solely by the claims that follow and the elements recited therein.

I claim:

1. A computer-readable medium storing contents that cause a computing system to perform a method for evaluating a spreadsheet cell, comprising:
   reading a function call stored in the spreadsheet cell, the function call specifying (1) an arbitrary geometric path, and (2) an operation to be performed on the specified path;
   performing the specified operation on the specified path; and
   attributing one or more values produced by performing the specified operation on the specified path as the evaluated value of the spreadsheet cell.

2. The computer-readable medium of claim 1 wherein the read function call further specifies a point in path coordinates, comprising a first path coordinate that specifies a position of an intermediate point on the path and second path coordinate that specifies a directed distance from the intermediate point to the specified point.

3. The computer-readable medium of claim 2 wherein the path has a first end and a second end, and wherein the first path coordinate specifies the position of the intermediate point on the path by specifying an absolute distance from the first end of the path.

4. The computer-readable medium of claim 2 wherein the path has a first end and a second end, and wherein the first path coordinate specifies the position of the intermediate point on the path by specifying a percentage of the total distance from the first end of the path to the second end of the path.

5. The computer-readable medium of claim 2 wherein the path has a first end and a second end, and wherein the read function call further specifies whether the first path coordinate specifies the position of the intermediate point on the path relative to the first end or the second end.

6. The computer-readable medium of claim 1 wherein the path is comprised of a series of segments, and wherein the read function call further specifies one of the series of segments on which the specified operation is to be performed.

7. The computer-readable medium of claim 6 wherein the path has a first end and a second end, and wherein the read function call further specifies one of the series of segments by specifying (1) either the first end or the second end of the path; and (2) the number of segments away from the specified end the specified segment is.

8. The computer-readable medium of claim 1, the method further comprising, before performing the specified operation on the specified path, normalizing the specified path.

9. The computer-readable medium of claim 8 wherein the specified path is comprised of a series of segments, each segment of the series being either a substantive segment of the path or a superficial segment added to the path to adapt the path to its visual environment, and wherein normalizing the specified path comprises generating a normalized path corresponding to the specified path that omits any superficial segments present in the series of the specified path.

10. The computer-readable medium of claim 1 wherein the specified path is defined in a set of path definition spreadsheet cells, the method further comprising reevaluating the spreadsheet cell containing the function call in response to determining that the value of one of the path definition spreadsheet cells of the set has changed.

11. The computer-readable medium of claim 1 wherein the function call specifies the path by containing a reference to a path spreadsheet cell representing the path.

12. The computer-readable medium of claim 11 wherein the reference to the path spreadsheet cell identifies the path spreadsheet cell by name.

13. The computer-readable medium of claim 11 wherein the reference to the path spreadsheet cell identifies the path spreadsheet cell by location.

14. The computer-readable medium of claim 1 wherein the read function call further specifies a point in path coordinates, comprising a first path coordinate that specifies a position of an intermediate point on the path and second path coordinate that specifies a directed distance from the intermediate point to the specified point,
and wherein the operation specified by the function call is converting the path coordinates for the specified point to Cartesian coordinates.

15. The computer-readable medium of claim 14 wherein the read function call specifies the specified operation by containing the function name PATHPOINT.

16. The computer-readable medium of claim 1 wherein the read function call further specifies a point in Cartesian coordinates, and wherein the operation specified by the function call is identifying a point on the specified path that is nearest the point specified in Cartesian coordinates.

17. The computer-readable medium of claim 16 wherein the identified point is identified in path coordinates, comprising a first path coordinate that specifies a position of an intermediate point on the path and second path coordinate that specifies a directed distance from the intermediate point to the identified point.

18. The computer-readable medium of claim 17 wherein the read function call specifies the specified operation by containing the function name PATHPARAB.

19. The computer-readable medium of claim 1 wherein the read function call further specifies a point on the path, and wherein the operation specified by the function call is determining an angle that is tangent to the path at the specified point.

20. The computer-readable medium of claim 17 wherein the read function call specifies the specified operation by containing the function name PATHTAN.

21. The computer-readable medium of claim 14, 16, or 19 wherein the specified path is displayable, the method further comprising using the result of the performing the operation to display the path together with text that is tangent to the path.

22. The computer-readable medium of claim 1 wherein the operation specified by the function call is determining the length of the path.

23. The computer-readable medium of claim 22 wherein the read function call specifies the specified operation by containing the function name PATHLEN.

24. The computer-readable medium of claim 23, the method further comprising using the result of the performing the operation to display the path together with the path's length.

25. The computer-readable medium of claim 1 wherein the operation specified by the function call is determining the area of a region enclosed by the path.

26. The computer-readable medium of claim 25 wherein the read function call specifies the specified operation by containing the function name PATHAREA.

27. The computer-readable medium of claim 25, the method further comprising using the result of the performing the operation to display the path together with the area of a region enclosed by the path.

28. The computer-readable medium of claim 1 wherein the read function call further specifies (1) a second path, and (2) a point in Cartesian coordinates, and wherein the operation specified by the function call is identifying the intersection of the two specified paths that is nearest the point specified in Cartesian coordinates.

29. The computer-readable medium of claim 28 wherein the read function call specifies the specified operation by containing the function name PATHINT.

30. The computer-readable medium of claim 1 wherein the read function call further specifies (1) a line, and (2) a point in Cartesian coordinates, and wherein the operation specified by the function call is identifying the intersection of the specified line with the specified path that is nearest the point specified in Cartesian coordinates.

31. The computer-readable medium of claim 30 wherein the read function call specifies the specified operation by containing the function name PATHRAYINT.

32. The computer-readable medium of claim 1 wherein the path is comprised of a series of segments, and wherein the read function call further specifies a coordinate identifying a position of an intermediate point on the path, and wherein the operation specified by the function call is identifying the segment of the series in which the intermediate point occurs.

33. The computer-readable medium of claim 32 wherein the read function call specifies the specified operation by containing the function name PATHSEGMENT.

34. The computer-readable medium of claim 1 wherein the path is comprised of a series of segments, and wherein the operation specified by the function call is determining the number of segments in the series.

35. The computer-readable medium of claim 34 wherein the read function call specifies the specified operation by containing the function name PATHSIZE.

36. The computer-readable medium of claim 1 wherein the read function call further specifies (1) a directed distance, and (2) a first point in Cartesian coordinates, and wherein the operation specified by the function call is identifying a second point that is the specified distance from the specified path that is nearest the first point.

37. The computer-readable medium of claim 36 wherein the read function call specifies the specified operation by containing the function name POINTINPATH.

38. The computer-readable medium of claim 1 wherein the operation specified by the function call is identifying a result point bound to the specified path.

39. The computer-readable medium of claim 38 wherein the read function call specifies the specified operation by containing the function name POINTONPATH.

40. A method performed by a computing system to evaluate a spreadsheet cell, the method comprising:
reading a function call stored in the spreadsheet cell, the function call specifying (1) an arbitrary geometric path, and (2) an operation to be performed on the specified path;

performing the specified operation on the specified path; and attributing one or more values produced by performing the specified operation on the specified path as the evaluated value of the spreadsheet cell, wherein code implementing the method is stored in memory of the computing system for execution by a processor of the computing system.

41. A computing system for evaluating a spreadsheet cell, comprising:

means for reading a function call stored in the spreadsheet cell, the function call specifying (1) an arbitrary geometric path, and (2) an operation to be performed on the specified path;

means for performing the specified operation on the specified path; and means for attributing one or more values produced by performing the specified operation on the specified path as the evaluated value of the spreadsheet cell.

42. A computing system for evaluating a spreadsheet cell, comprising:

a memory that stores contents of the spreadsheet cell, the contents of the spreadsheet cell including a function call, the function call specifying (1) an arbitrary geometric path, and (2) an operation to be performed on the specified path; and a processor that (1) performs the specified operation on the specified path, and attributes one or more values produced by performing the specified operation on the specified path as the evaluated value of the spreadsheet cell.

* * * * *

UNITED STATES PATENT AND TRADEMARK OFFICE
CERTIFICATE OF CORRECTION

PATENT NO.       : 7,612,776 B2                                          Page 1 of 1
APPLICATION NO. : 10/940445
DATED            : November 3, 2009
INVENTOR(S)      : Craig A. Hobbs It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1379 days.

Signed and Sealed this

Nineteenth Day of October, 2010

David J. Kappos
*Director of the United States Patent and Trademark Office*